(12) United States Patent
Jin et al.

(10) Patent No.: US 11,973,924 B2
(45) Date of Patent: Apr. 30, 2024

(54) BARRIER PANEL AND 3D DISPLAY DEVICE HAVING THEREOF

(71) Applicant: LG DISPLAY CO., LTD, Seoul (KR)

(72) Inventors: You-Yong Jin, Paju-si (KR); Hee-Jin Im, Paju-si (KR); Yong-Ku Lee, Paju-si (KR); Wook Jeon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 30 days.

(21) Appl. No.: 17/539,639

(22) Filed: Dec. 1, 2021

(65) Prior Publication Data

US 2022/0201270 A1    Jun. 23, 2022

(30) Foreign Application Priority Data

Dec. 23, 2020   (KR) .................. 10-2020-0182018

(51) Int. Cl.
*H04N 13/312* (2018.01)
*G02F 1/1335* (2006.01)
*G02F 1/1337* (2006.01)
*H04N 13/359* (2018.01)

(52) U.S. Cl.
CPC ..... *H04N 13/312* (2018.05); *G02F 1/133528* (2013.01); *G02F 1/133769* (2021.01); *H04N 13/359* (2018.05)

(58) Field of Classification Search
CPC .... H04N 13/312; H04N 13/359; H04N 13/31; G02F 1/133528; G02F 1/133769; G02F 1/1343; G02F 2201/30; G02F 1/1337; G02B 30/31
USPC ......................................................... 348/51
See application file for complete search history.

(56) References Cited

U.S. PATENT DOCUMENTS

| | | | | |
|---|---|---|---|---|
| 2014/0016049 A1* | 1/2014 | Yoshikaie | ............ | H04N 13/317 349/15 |
| 2015/0365655 A1* | 12/2015 | Oka | .................. | G02F 1/134309 348/54 |
| 2016/0050410 A1* | 2/2016 | Oh | .......................... | G06F 3/013 348/51 |
| 2016/0379394 A1* | 12/2016 | Kim | ....................... | G02B 30/27 345/629 |

(Continued)

FOREIGN PATENT DOCUMENTS

| KR | 10-1194856 B1 | 7/2007 |
|---|---|---|
| KR | 10-1307572 B1 | 9/2013 |
| KR | 10-1476884 B1 | 1/2014 |

*Primary Examiner* — Christopher S Kelley
*Assistant Examiner* — Ana Picon-Feliciano
(74) *Attorney, Agent, or Firm* — POLSINELLI PC

(57) ABSTRACT

A barrier panel includes a first substrate and a second substrate having block region and transmission region; a liquid crystal layer between the first and second substrates, the liquid crystal layer including a plurality of liquid crystal molecules aligned in a predetermined direction; a plurality of barrier electrodes in the block region and the transmission region of the first substrate; a common electrode on the second substrate to apply an electric field to the liquid crystal layer with the plurality of barrier electrodes; a diffraction unit in the plurality of barrier electrodes to diffract the light transmitting therethrough; and a polarization plate over the second substrate, wherein an optical axis direction of the polarization plate is parallel to the alignment direction of the liquid crystal molecule to transmit an image through an area where the electric field is not applied.

19 Claims, 9 Drawing Sheets

(56) References Cited

U.S. PATENT DOCUMENTS

2020/0341330 A1\* 10/2020 Tanahara ............. H04N 13/398

\* cited by examiner

BARRIER PANEL AND 3D DISPLAY DEVICE HAVING THEREOF

CROSS-REFERENCE TO RELATED APPLICATION

This application claims the priority of Korean Patent Application No. 10-2020-0182018, filed Dec. 23, 2020, which is hereby incorporated by reference in its entirety.

BACKGROUND

Field of the Disclosure

The present disclosure relates to a barrier panel and a 3-dimension (3D) display device having thereof.

Description of the Background

A 3D display device refers to system for displaying artificially a 3 dimension image. The system includes software technology for creating a 3D contents and hardware technology for displaying the 3D content made by the software technology. The reason for including the software technology in the 3D display device is that the 3D contents should be made of the different software for each 3D implementation method in the 3D hardware technology.

The virtual 3D display is a system that enables a virtual three-dimensional effect on flat display hardware by using binocular disparity, which appears when our eyes are about 65 mm apart in the horizontal direction, one of the factors that a person feels a three-dimensional effect. In other word, Because of binocular disparity, even when looking at the same object, our eyes see slightly different images (to be precise, each has slightly different spatial information on the left and right). When these two images are transmitted to the brain through the retina, the brain precisely fuses them together so that we can feel a three-dimensional effect. Using the binocular disparity, it is a virtual 3D display that creates a virtual three-dimensional effect through a design that simultaneously displays two left and right images on a 2D display device and sends them to each eye.

In the hardware apparatus of this virtual 3D display device, one channel is outputted one by one while changing the lines one by one in either the horizontal or vertical direction on one screen to display image of two channels in one screen. When the images of two channels are simultaneously output to one display device, the right image is input to only the right eye and the left image is input to only the left eye in glass-free type 3D technology. Further, in glass type 3D technology, the right image inputting to the left eye is blocked and the left image inputting to the right eye by a specific glass corresponding to each of various types of the stereoscopic 3D method.

As such, the most important factor in which a person feels a sense of three-dimensionality and depth is the binocular disparity caused by the distance between the two eyes. In addition to binocular disparity, three-dimensionality and depth have a deep relationship with psychological and memory factors. In addition, the three-dimensional realization method can be divided into a volumetric type, a holographic type, and a stereoscopic type based on how much 3D image information can be provided to the observer.

The volumetric type is a method to feel the perspective of the depth direction by psychological factors and suction effects. This volumetric type can be adapted to a three-dimensional computer graphics which displays the image by calculation perspective, overlap, shading, contrast, and movement by calculation, or to an eye Max movie that provides a large screen with a wide viewing angle for the observer to cause an optical illusion like being sucked into the space.

The three-dimensional expression method, which is known as the most complete three-dimension image realization technology, may be a laser light reproduction holography or a white light reproduction holography.

The three-dimensional expression method is a method of feeling a three-dimensional effect using physiological factors of both eyes. This three-dimensional expression method uses stereography. That is, it utilizes the ability to sense a three-dimensional effect by generating spatial information on the front and rear of the display surface in the process of brain fusion of plane-related images including parallax information of the human left and right eyes. The three-dimensional expression method is largely divided into a glasses method and a non-glasses method.

The glasses method includes a lenticular method in which a lenticular lens plate in which cylindrical lenses are vertically arranged in front of the display panel and a parallax barrier method in which the parallax barrier is disposed in front of the display panel.

However, there is a problem in the 3D display device of the parallax barrier method. That is, in the 3D display device of the parallax barrier method, the user can watch the 3D image without glasses, but 2D and 3D conversion is impossible. Of course, it is possible to implement the 2D image with the image passing through the parallax barrier. However, in this case, since the user cannot detect the image blocked by the parallax barrier, the luminance is lowered.

SUMMARY

Accordingly, the present disclosure is to provide a barrier panel and a display device having thereof capable of switching 2D and 3D.

The present disclosure is also to provide the barrier panel and the display device capable of improving overall luminance and preventing luminance non-uniformity by forming a diffraction unit in a barrier electrode so that light reaches an area where the luminance is lowed.

In order to achieve the above, a barrier panel according to this disclosure includes a first substrate and a second substrate having block region and transmission region; a liquid crystal layer between the first substrate and the second substrate, the liquid crystal layer including a plurality of liquid crystal molecules aligned in a predetermined direction; a plurality of barrier electrodes in the block region and the transmission region of the first substrate; a common electrode on the second substrate to apply an electric field to the liquid crystal layer together with the barrier electrode; a diffraction unit in the barrier electrode to diffract the light transmitting therethrough; a driving electrode for applying a driving voltage to the barrier electrode; and a polarization plate over the second substrate, an optical axis direction of the polarization plate being parallel to the alignment direction of the liquid crystal molecule to transmit an image through an area where the electric field is not applied.

The diffraction unit may be a gap between the adjacent barrier electrodes. At this time, the adjacent barrier electrodes are disposed on same layer or the adjacent barrier layers are respectively disposed on the different layers.

The diffraction unit may be an opening unit formed in the barrier electrode. At this time, the adjacent barrier electrodes are formed on the different layers and part of the adjacent barrier electrodes are overlapped for each other. The opening unit is formed at the same position of the adjacent barrier electrodes and the opening unit is alternately formed in the adjacent barrier electrodes.

BRIEF DESCRIPTION OF THE DRAWINGS

The accompanying drawings, which are included to provide a further understanding of the disclosure, are incorporated in and constitute a part of this disclosure, illustrate implementations of the disclosure and together with the description serve to explain the principles of aspects of the disclosure.

DETAILED DESCRIPTION

Figure 1:
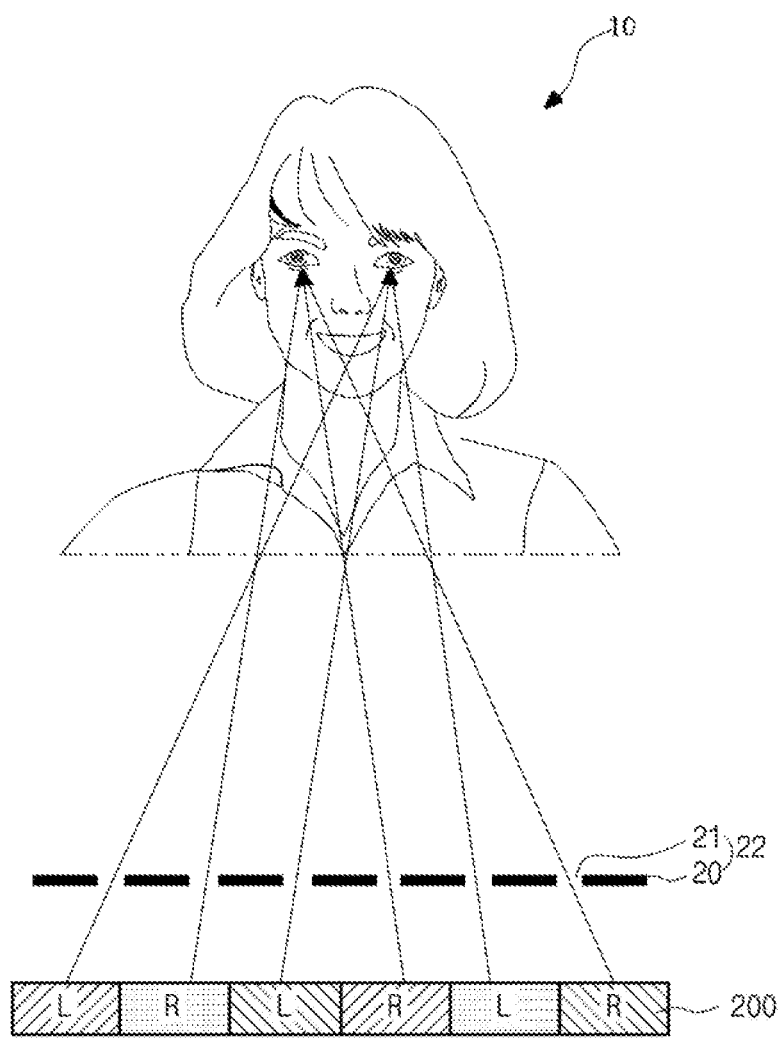
FIG. 1 is a view conceptually illustrating the 3D displaying method using a barrier panel.

Advantages and features of the present disclosure and methods for achieving them will be made clear from aspects described in detail below with reference to the accompanying drawings. The present disclosure may, however, be implemented in many different forms and should not be construed as being limited to the aspects set forth herein, and the aspects are provided such that this disclosure will be thorough and complete and will fully convey the scope of the present disclosure to those skilled in the art to which the present disclosure pertains, and the present disclosure is defined only by the scope of the appended claims.

Shapes, sizes, ratios, angles, numbers, and the like disclosed in the drawings for describing the aspects of the present disclosure are illustrative, and thus the present disclosure is not limited to the illustrated matters. The same reference numerals refer to the same components throughout this disclosure. Further, in the following description of the present disclosure, when a detailed description of a known related art is determined to unnecessarily obscure the gist of the present disclosure, the detailed description thereof will be omitted herein. When terms such as "including," "having," "consisting of," and the like mentioned in this disclosure are used, other parts may be added unless the term "only" is used herein. When a component is expressed as being singular, being plural is included unless otherwise specified.

In analyzing a component, an error range is interpreted as being included even when there is no explicit description.

In describing a positional relationship, for example, when a positional relationship of two parts is described as being "on," "above," "below," "next to," or the like, unless "immediately" or "directly" is not used, one or more other parts may be located between the two parts.

In describing a temporal relationship, for example, when a temporal predecessor relationship is described as being "after," "subsequent," "next to," "prior to," or the like, unless "immediately" or "directly" is not used, cases that are not continuous may also be included.

Although the terms first, second, and the like are used to describe various components, these components are not substantially limited by these terms. These terms are used only to distinguish one component from another component. Therefore, a first component described below may substantially be a second component within the technical spirit of the present disclosure.

In describing components of the specification, the terms first, second, A, B, (a), (b), and the like can be used. These terms are intended to distinguish one component from other components, but the nature, sequence, order, or number of the components is not limited by those terms. When components are disclosed as being "connected," "coupled," or "in contact" with other components, the components can be directly connected or in contact with the other components, but it should be understood that another component(s) could be "interposed" between the components and the other components or could be "connected," "coupled," or "contacted" therebetween.

In the specification, a "display device" may include display devices in a narrow sense, such as liquid crystal modules (LCMs), OLED modules, and quantum dot (QD) modules, and the like which include display panels and drivers for driving the display panels. In addition, the display device may also include laptop computers, televisions, and computer monitors which are complete products or final products including LCMs, OLED modules, QD modules, or the like, equipment displays including automotive displays or other types of vehicles, and set electronic devices, set devices, or set apparatuses such as mobile electronic devices such as smartphones or electronic pads.

Thus, the display device in the specification may include display devices in a narrow sense, such as LCMs, OLED modules, QD modules, or the like, and application products or set devices which are end consumer devices, which include the LCMs, the OLED modules, the QD modules, or the like.

In addition, in some cases, it may be separately expressed that LCMs, OLED modules, and QD modules, which include display panels and drivers, are expressed as "display devices" in some cases, and electronic devices as complete products including the LCMs, the OLED modules, or QD modules are expressed as "set devices." For example, the display device in a narrow sense may be a concept including a display panel such as a liquid crystal display (LCD) panel, an OLED panel, or a QD display panel, and a source printed circuit board (PCB) which is a controller for driving the display panel, and the set device may be a concept further including a set PCB which is a set controller which is electrically connected to the source PCB to control an entirety of the set device.

The display panel used in the present aspect may employ all types of display panels such as a liquid crystal display panel, an OLED panel, a QD display panel, an electroluminescent display panel, and the like. However, the present disclosure is not limited to a specific display panel of which a bezel may be bent with a flexible substrate for an OLED panel of the present aspect and a backplane support structure below the flexible substrate. In addition, the display panel used in the display device according to an aspect of the specification is not limited to a shape or size of the display panel.

For example, when the display panel is an OLED panel, the display panel may include a plurality of gate lines, a plurality of data lines, and a plurality of pixels formed in intersection regions between the gate lines and the data lines. In addition, each of the pixels may include an array including a thin film transistor (TFT) which is an element for selectively applying a voltage to each pixel, an OLED layer on the array, and an encapsulation substrate or an encapsulation layer, which is disposed on the array to cover the OLED layer. The encapsulation layer may protect the TFT and the OLED layer from an external impact and prevent moisture or oxygen from infiltrating into the OLED layer. In addition, a layer formed on the array may include an inorganic light emitting layer, e.g., a nano-sized material layer or a quantum dot.

Hereinafter, aspects of the present disclosure will be described in detail with reference to the accompanying drawings.

This disclosure provides the display device capable of viewing the 2D image and the 3D image. This disclosure provides the 3D display device of parallax barrier type. In this disclosure, in order to watch the 2D image and the 3D view, the variable barrier panel having a liquid crystal may be used as the barrier panel, not the parallax barrier having barriers and slits.

In this disclosure, a block region and a transmission region of the barrier panel are moving in accordance with the movement of the user, so that the range of left and right viewing angles are improved and the 3D image may be provided to the user moving in real time.

In this disclosure, further, since the display device includes the diffraction unit for diffracting the light passing the barrier electrodes, the luminance non-uniformity according to the views can be improved.

FIG. 1 is an exemplary view schematically illustrating the concept of an operation of the barrier type 3D display device according to this disclosure.

As shown in FIG. 1, the barrier type 3D display device according to this disclosure includes display panel 40 for displaying simultaneously the left-eye image and the right-eye image and the barrier panel 20 at the front of the display panel 40.

A plurality of left-eye pixels L and right-eye pixels R are alternatively disposed in the display panel 40 and the barrier panel 20 is disposed between the display panel 40 and the user 30.

The barrier panel 20 includes a plurality of barriers 21 and a plurality of slits 22 between the barriers 21. The left-eye image and the right-eye image are separated by the barrier panel 20 and then displayed simultaneously on the screen of the 3D display device.

In this 3D display device, the left-eye image displayed on the left-eye pixel L of the display panel 40 reaches the left eye of the user 30 through the slit 22 of the barrier panel 20. The right-eye image displayed on the right-eye pixel R of the display panel 40 reaches the right eye of the user 30 through the slit 22 of the barrier panel 20. The images for the left and right eyes contain separate images in consideration of the human-detectable parallax, respectively, and the user 30 recognizes the 3D image by combining the two images.

Figure 2A:
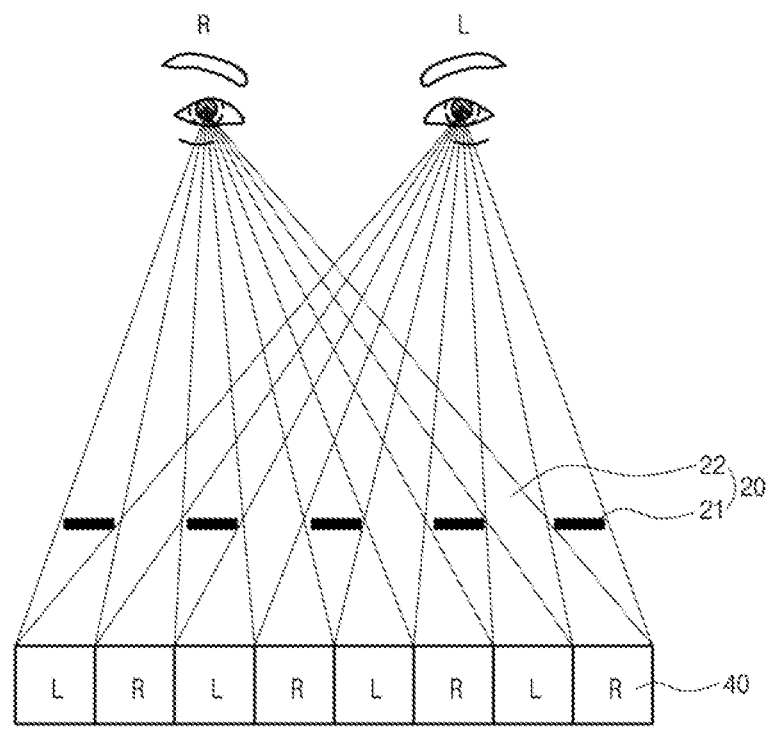
FIGS. 2A-2C the view illustrating movement of the barrier panel when the user moves.
Figure 2B:
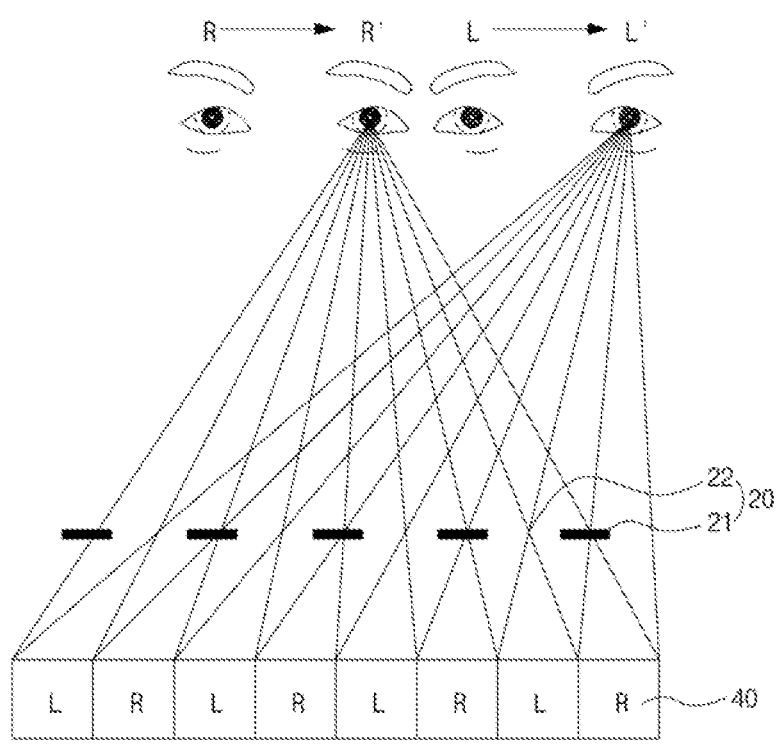
Figure 2C:
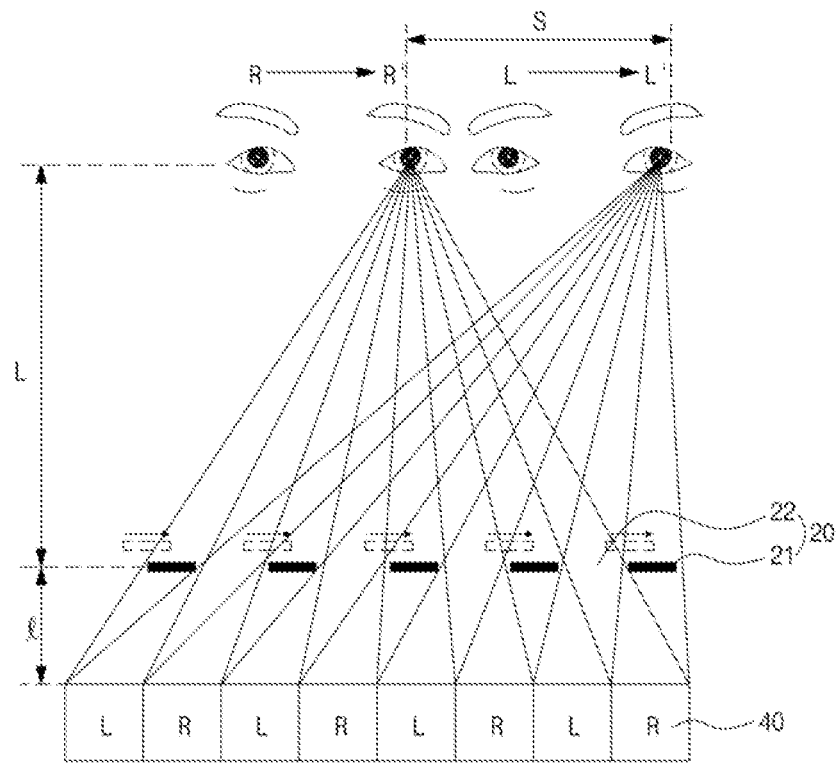

FIGS. 2A-2C are views showing the drive of the barrier 21 according to the movement of the user in the barrier type 3D display device of this disclosure. It describes the realization of the 3D image by moving the parallax barrier as the user moves.

As shown in FIG. 2A, when the user is positioned at the position R and L within the range of left and right viewing angles (approximately 5 degrees left and right) in which the user can view the 3D display device, the left-eye pixel L and the right-eye pixel R of the display panel 40 outputs respectively the left-eye image and the right-eye image. This output images reaches to the barrier panel 20.

At this time, among the left-eye images output from the left-eye pixel L, the image moving to the user's right eye is blocked by the barrier of the barrier panel 20, and only the image moving to the user's left eye is transmitted through the slit to reach the user's left eye. Among the right-eye images output from the right-eye pixel R, the image moving toward the user's left eye is blocked by the barrier of the barrier panel 20, and only the image moving toward the user's right eye is transmitted through the slit to reach the user's right eye. The user feels 3D effect by combining the reached left-eye image and right-eye image.

As shown in FIG. 2B, when the user moves from the position R and L to the position R' and L', the user's position exceeds the range of the left and right viewing angles, and as a result the incident angle of the images from the left-eye pixel L and the right-eye pixel R to the user's left and right eyes is changed. Accordingly, a portion of the left-eye image, which output from the left-eye pixel L and reaching the user's left eye, is blocked by the barrier, and a portion of the left-eye image reaches the user's right eye. Further, a portion of the right-eye image, which output from the right-eye pixel R and reaching the user's right eye, is blocked by the barrier, and a portion of the right-eye image reaches the user's left eye. Since a part of the right-eye image arrives to the user's left eye and a part of the left-eye image arrives to the user's right eye, the quality of the 3D image is deteriorated or even the 3D image is not implemented.

In this disclosure, when the user moves from position R and L to position R' and L', the 3D image is realized by moving the barrier 21 of the barrier panel 20 by a certain distance as shown in FIG. 2C. In FIG. 2C, the dotted line is the position of the barrier 21 when the user is at position R and L, and the solid line is the position of the barrier 21 when the user moves to the position R' and L'. When the user moves from the position R and L to the position R' and L' to the right, the barrier 21 also moves to the right as much as the user's moving distance, so that the left-eye image reaches only the user's left eye and the right-eye image only reaches the user's right eye.

The moving distance of the barrier 21 according to the movement of the user is determined by a distance L between the barrier panel 20 and the user and by the distance $\ell$ between the barrier panel 20 and the display panel 20.

As described above, in this disclosure, the 3D image is implemented by moving the barrier 21 of the barrier panel 20 as the user moves so that the left-eye image always reaches only the user's left eye and the right-eye image always reaches only the user's right eye.

Meanwhile, in this disclosure, not only when the user moves to a specific area, but also when the user moves in real time, the moving user can always watch the 3D image by moving the barrier panel 20 in real time.

Figure 3:
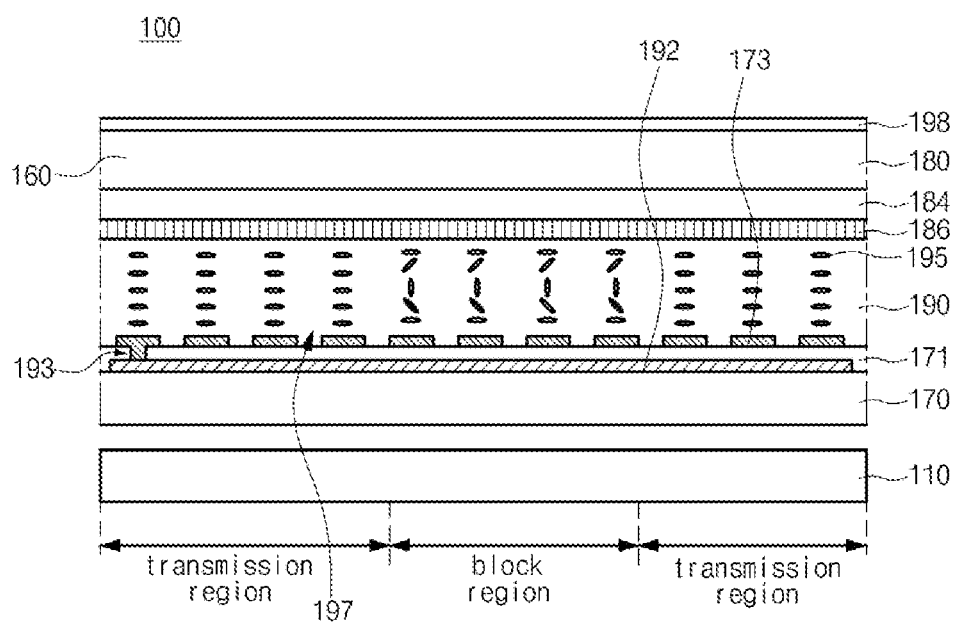
FIG. 3 is the sectional view of the display device according to a first aspect of this disclosure.

FIG. 3 is the view showing the structure of the 3D display device 100 according to the first aspect of this disclosure.

As shown in FIG. 3, the 3D display device according to the first aspect includes a display panel 110 and a barrier panel 160 in the front of the display panel to display the 2D image and 3D image by blocking and transmitting selectively the left-eye image and the right-eye image from the display panel 110.

Not shown in figure, a plurality of left-eye pixels for displaying the left-eye image and a plurality of right-eye pixels for displaying the right-eye image are alternatively disposed in the display panel 110. The display panel may be various flat display panel such a liquid crystal display panel, an organic light emitting display panel, an electrophoresis display panel, a micro LED display panel, and a mini LED display panel.

The barrier panel 160 includes a first substrate 170, a second substrate 180, and a liquid crystal layer therebetween.

The first substrate includes an insulating layer 171 and a plurality of barrier electrodes 173 thereon. Although the insulating layer is made of single layer in the figure, the insulating layer may be made of a plurality of layers. The insulating layer 171 may be made of inorganic material or organic material. Further, the insulating layer 171 may be composed of organic layer/inorganic layer or inorganic layer/inorganic layer.

The barrier electrode 173 is made of transparent electronic material such as ITO (Indium Tin Oxide) or IZO (Indium Zinc Oxide). The barrier electrode 173 includes a diffraction unit for diffracting the light.

A driving electrode 192 is formed in the first substrate 170. The driving electrode 192 is electrically connected to the barrier electrode 173 through a contact hole 193 formed in the insulating layer to apply the voltage to the barrier electrode 173. As shown in figure, the driving electrode is formed on the first substrate. However, the driving electrode may be formed on the insulating layer. The driving electrode 192 is made of metal having good conductivity such as Al or Al alloy and the transparent conductive material such as ITO or IZO.

On the inner surface of the second substrate 180 which is facing with the first substrate 170, a planarization layer 184 is formed in the whole area of the second substrate 180 and a common electrode 186 is formed on the planarization layer 194. The common electrode 186 made of transparent conductive material such as ITO or IZO is formed in the whole area of the second substrate 180.

A spacer (not shown in figure) is disposed between the first substrate 170 and the second substrate 180 to maintain uniformly the gap therebetween. Although not shown in figure, a sealant may be coated at the outer region of the first substrate 170 and the second substrate 180 to attach the first substrate 170 and the second substrate 180 and to seal the liquid crystal layer 190.

A common voltage is applied to the common electrode 186 and a driving voltage is applied to the barrier electrode 173 to apply an electric field to the liquid crystal layer 190 caused by a voltage difference of the common electrode 186 and the barrier electrode 173, so that liquid crystal molecules are aligned along the electric field.

Not shown in figure, a first alignment layer and a second alignment layer, which are align-treated by rubbing process, are respectively formed on the first substrate 170 and the second substrate 180 and the liquid crystal molecules are aligned along the alignment direction of the first alignment layer and the second alignment layer. The first alignment directions of the first alignment layer and the second alignment layer may be perpendicular for each other and thus liquid crystal molecules are twisted at 90 degree from the first substrate 170 to the second substrate 180. The first alignment directions of the first alignment layer and the second alignment layer may be parallel for each other and thus liquid crystal molecules are aligned at same direction in the entire liquid crystal layer 190.

A polarization plate 198 is attached to the outer surface of the second substrate 180. The polarization plate 198 blocks and transmits the light through the liquid crystal layer 190 to implement 2D image and 3D image. At this time, the direction of an optical axis of the polarization plate 198 is determined by the alignment direction of the first alignment layer and the second alignment layer. In this disclosure, the direction of the optical axis of the polarization plate 198 is parallel to the alignment direction of the first alignment layer and the second alignment layer, and thus the direction of the optical axis of the polarization plate 198 is parallel to the alignment direction of the liquid crystal molecule 195.

In the 3D display device according to this disclosure, the barrier panel 160 plays same role of the barrier 20 shown in FIG. 2C and this will be described as follow.

As shown in FIG. 3, in this disclosure, the electric field is formed between the barrier electrode 173 of the first substrate 170 and the common electrode 186 of the second substrate 186 and is applied to the liquid crystal layer 190.

At this time, the barrier electrode 173 is made in the fine pattern, so that the plurality of the barrier electrodes 173 forms the block region corresponding to the barrier of FIG. 2C and the transmission region corresponding to the slit of FIG. 2C. In this disclosure, each of four barrier electrodes 173 forms one block region and one transmission region. Further, five or more barrier electrodes 173 may form on block region and one transmission region, or four less barrier electrodes 173 may form on block region and one transmission region.

The electric is generated by the relative voltage difference between the common electrode 186 and the barrier electrode 173. That is, when the common voltage is applied to the common electrode 186, the electric filed is not generated if the voltage applied to the barrier electrode 173 is the same as the common voltage and the electric field is generated if the voltage applied to the barrier electrode 173 is different from the common voltage. That is, the electric field is generated when the voltage applied to the barrier electrode 173 is higher or less than the common voltage. Hereinafter, this will be referred to as a driving voltage. At this case, the common voltage can be 0V, or more or less voltage, that is ±V. Hereinafter, a case in which the common voltage is 0V will be described for convenience of description, but the common voltage may be greater than or equal to 0V.

The left and right-eye images of the display panel 110 are incident to the barrier panel 160 which is disposed in front of the display panel 110. When the same voltage as the common voltage is applied to all the barrier electrodes 173 (i.e., the voltage of 0V in which no voltage is applied), an electric field is not formed over the entire liquid crystal layer 190. Accordingly, the liquid crystal molecules 195 of the entire liquid crystal layer 190 are arranged along the alignment directions of the first alignment layer and the second alignment layer.

Accordingly, an image in the same optical axis direction as the alignment direction of the liquid crystal molecules 195 among the images incident from the display panel 110 transmits through the liquid crystal layer 190. On the other hand, since the optical axis direction of the polarization plate 198 is parallel to the alignment direction of the liquid crystal molecule 195, all the optical components of the left and right-eye images passing the liquid crystal layer 190 passes the polarization plate 198 and then reaches to the user. In other word, since the optical components of the left and right eyes reaches to the both eyes of the user, the user can recognize the 2D image.

When the voltage having the intensity different from the common voltage is applied to the barrier electrode 173 in the block region and the voltage same as the common voltage (0 V) is applied to the barrier electrode 173 in the transmission region, the electric field is applied to the liquid crystal panel 190 in the block region and not applied to the liquid crystal panel 190 in the transmission region. Since the electric field is not applied to the liquid crystal molecule 195 of the liquid crystal layer 190 in the transmission region, the liquid crystal molecule 195 of the liquid crystal layer 190 is aligned along the alignment direction of the alignment layer in the transmission region. Further, the liquid crystal molecule 195 of the liquid crystal layer 190 in the block region is aligned along the electric field vertical to the surface of the first substrate 170 and thus the liquid crystal molecule 195 of the liquid crystal layer is vertically arranged to the surface of the first substrate 170 in the block region.

When the left-eye image and the right-eye image are output from the display panel 110, the optical component parallel to the alignment direction of the alignment layer among the left-eye image and the right-eye image incident into the transmission region passes through the liquid crystal layer 190 and then reaches the polarizing plate 198. At this time, since the optical components of the left-eye image and the right-eye image and the optical axis directions of the polarizing plate 198 are parallel, the optical components of the left-eye image and the right-eye image reach respectively the user's left or right eye through the polarizing plate 198.

The left-eye image and the right-eye image from the display panel 110 is incident to the block region, only the optical component parallel to the vertical electric field among the left-eye image and the right-eye image passes the liquid crystal layer 190 and then reaches the polarization plate 198. Since the optical axis of the polarization plate 198 is not parallel to the optical component of the left-eye image and the right-eye image passing the liquid crystal layer 190, the optical component of the left-eye image and the right-eye image is blocked by the polarization plate 190 and then not reach the user's eye.

As describe above, in the barrier panel 160 of this disclosure, the image is blocked by applying the driving voltage to the barrier electrode 173 in the block region and the image is transmitted by applying the voltage same as the common voltage (that is, 0V) to the barrier electrode 173 in the transmission region. Accordingly, the left-eye image and the right-eye image are selectively transmitted in the transmission to display the 3D image.

The block region of the barrier panel 160 shown in FIG. 3 corresponds to the barrier of the barrier panel of FIG. 1 and the transmission region of the barrier panel 160 corresponds to the slit of the barrier panel of FIG. 1. Thus, the left-eye image from the display panel 110 transmits the transmission region and reaches the user's left eye, while the right-eye image is blocked by the block region and does not reach the user's left eye. Further, the right-eye image from the display panel 110 transmits the transmission region and reaches the user's right eye, while the left-eye image is blocked by the block region and does not reach the user's right eye. These reached left and right-eye images are combined so that the user can recognize the 3D image.

As described above, in this disclosure, the 2D image can be displayed by applying the same driving voltage as the common voltage to all the barrier electrodes 173. Further, the 3D image can be displayed by applying the driving voltage different from the common voltage to the barrier electrode 173 of the blocking region and applying the same driving voltage as the common voltage to the barrier electrode 173 of the transmission region. Accordingly, the 2D and 3D images can be displayed on one display device.

The block region and the transmission region may be variable. That is, as the user moves, the block region and the transmission region also moves, so that the user can always watch the 3D display. In this disclosure, the block region is the region that the driving voltage is applied to the barrier electrode 173 to align the liquid crystal molecule 195 by the electric field to block the image and the transmission region is that the driving voltage is not applied to the barrier electrode 173 (that is, the driving voltage of 0 V is applied to the barrier electrode 173) to transmit the image. That is, in this disclosure, the block region and the transmission region can be defined whether or not the driving voltage is applied to the barrier electrode 173 (or by the magnitude of the driving voltage to the barrier electrode 173). In other word, the block region and the transmission region can be variable by varying the driving voltage to the barrier electrode 173.

In this disclosure, four barrier electrodes 173 are respectively formed in one block region and one transmission region, a barrier pitch of the barrier panel is composed of eight barrier electrodes 173. However, the barrier pitch of the barrier panel can be composed of various number of the barrier electrode 173.

When the user moves, the block region and the transmission regions also move. That is, a portion of the barrier electrode 173 which the driving voltage is applied moves and thus the block region and the transmission regions move.

Figure 4:
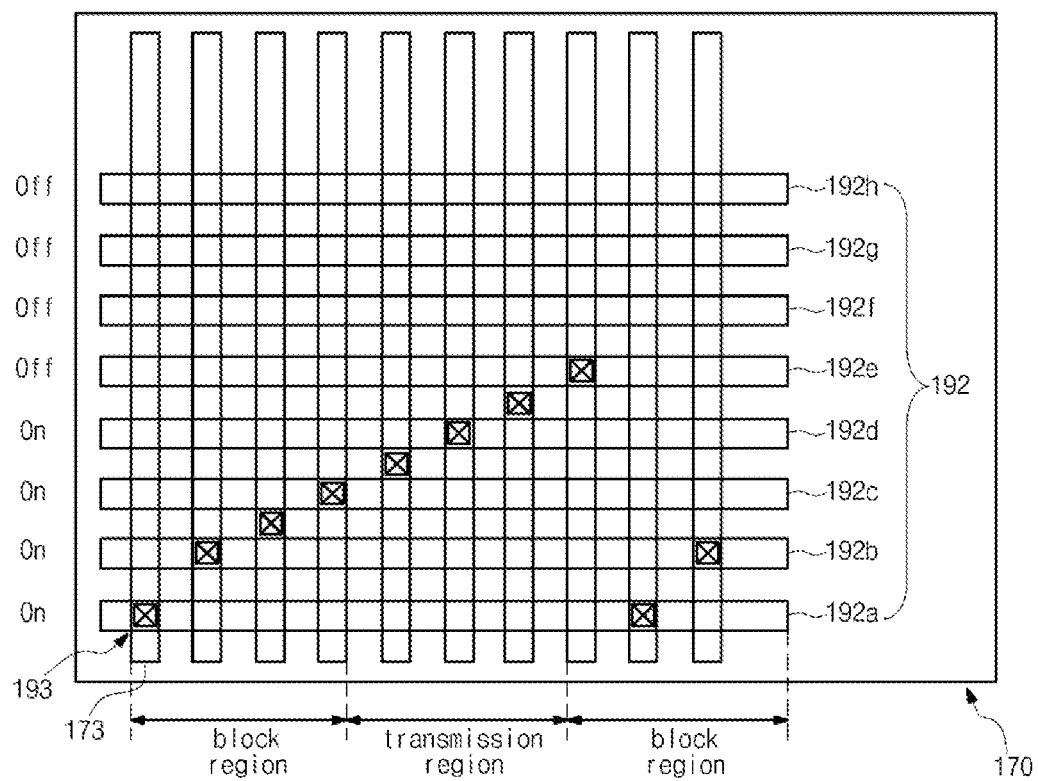
FIG. 4 is the view illustrating schematically the structure of electrodes according to the first aspect of this disclosure.

FIG. 4 is view showing the structure of the barrier panel 160 of this disclosure and the process of applying the driving voltage to the barrier electrode 173 will be described with reference to this figure.

As shown in FIG. 4, the driving electrode 192 is disposed below the barrier electrode 173 with the insulating layer interposed therebetween and connected to the barrier electrode 173 through the contact hole 193. Since each of the block region and the transmission region is composed by four barrier electrodes 173, in this disclosure, the driving voltage is applied to four barrier electrodes 173 at once and the same voltage as the common voltage is applied to four barrier electrode 173 at once to form the block region and the transmission region. Therefore, 8 driving electrodes 192a-192h connected to 8 barrier electrodes 173 are necessary to display the 3D image by applying the voltage to the barrier electrode 173.

In this case, when the number of barrier electrodes 173 formed in the barrier pitch is less than or more than eight, the corresponding driving electrodes 192 are also formed in the same number as the barrier electrodes 173.

In FIG. 4, the 1-4th driving electrodes 192a-192d are electrically connected to the four barrier electrodes 173 of the first group from the left side, and the 5-8th driving electrodes 192*e*-192*h* are electrically connected to the four barrier electrodes of the second group from the left side. From one side of the barrier panel 160, four barrier electrodes are connected to the 1-4th driving electrodes 192*a*-192*d* and the next four barrier electrodes are connected to the 5-8th driving electrodes 192*e*-192*h*. The next four barrier electrodes are again connected to the 1-4th driving electrodes 192*a*-192*d*. This electrical connection is repeated throughout the barrier panel 160 so that all the barrier electrodes 173 formed in the barrier panel 160 are electrically connected to the eight driving electrodes 192.

In this case, since the driving voltage is applied to the 1-4th driving electrodes 192*a*-192*d* and the same voltage as the common voltage is applied to the 5-8th driving electrodes 192*e*-192*h*, the 1-4th driving electrodes 192*a*-192*d* are turned on (i.e., forming the electric field with the common electrode) and the 5-8th driving electrodes 192*e*-192*h* are turned off (i.e., not forming the electric field). Accordingly, in the electrode structure of FIG. 4, the 1-4th driving electrodes 192*a*-192*d* become the block region and the 5-7th driving electrodes 192*e*-192*h* become the transmission region.

When the user moves, the region in which the voltage is applied to the driving electrode 192 is varied. For example, in the structure of FIG. 4, when the user moves to the right, the common voltage, instead of a driving voltage, is applied to the 1st driving electrode 192*a* and a driving voltage, instead of a common voltage, is applied to the 5th driving electrode 192*e*, so that the first barrier electrode 173 from left side is switched from the on state to the off state, and the fifth barrier electrode 173 from the left side is switched from the off-state to the on-state.

Figure 5:
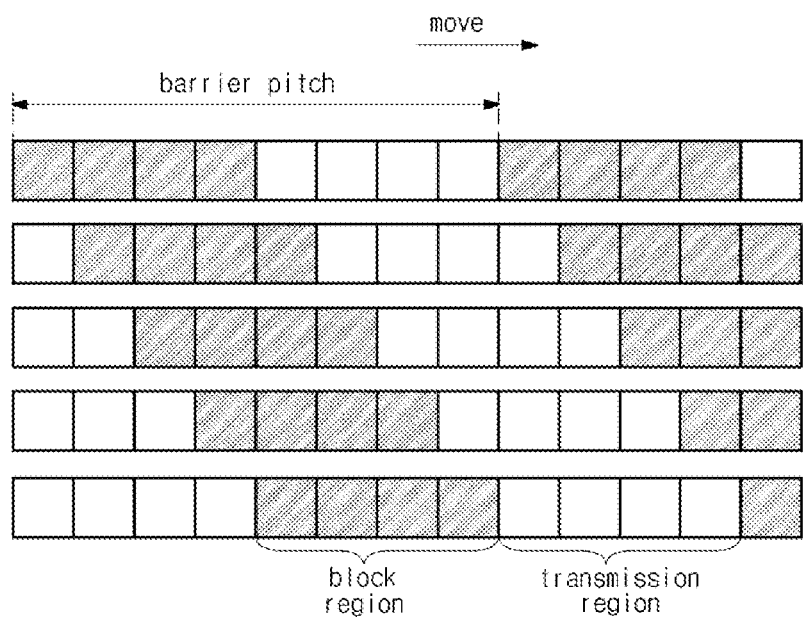
FIG. 5 is the view illustrating the drive of the electrodes when the user moves.

As a result, the block region and the transmission region move respectively to the right by the pitch of the barrier electrode 173. As shown in FIG. 5, as the user continuously moves, the change of voltage supplication to the driving electrode 192 is repeated so that the block region and the transmission region move along with the movement of the user, thereby realizing a 3D image. In FIG. 5, the hatched area is a block area and the non-hatched area is a transmission area. As the user moves, the driving voltage applying portion of the barrier electrode 173 is changed so that the block region and the transmission region can be moved to the right.

Meanwhile, in this disclosure, the structures of the barrier electrode 173 and the driving electrode 192 are not limited to the specific structure shown in FIG. 4. Although the barrier electrode 173 and the driving electrode 192 are connected through the contact hole in FIG. 4, the barrier electrode 173 can be directly connected to the driving electrode 192 without the contact hole. Therefore, the driving electrode 192 for applying the driving voltage to the barrier electrode 173 can be formed in various shapes in this disclosure.

As describe above, the voltage applying portion of the barrier electrode 173 is varied accordingly to the movement of the user in this disclosure. At this time, the movement of the user is detected by an eye tracking system for detect the user's eye.

The eye tracking system captures the user's eye by a camera to detect the position thereof. The voltage is applied to the driving electrodes 192*a* to 192*h* based on the detected position to adjust the block region and the transmission region.

However, in this barrier panel 160, when the block region and the transmission region move by the pitch of the barrier electrode 173 by moving the user, the luminance variation may be occurred.

Figure 6:
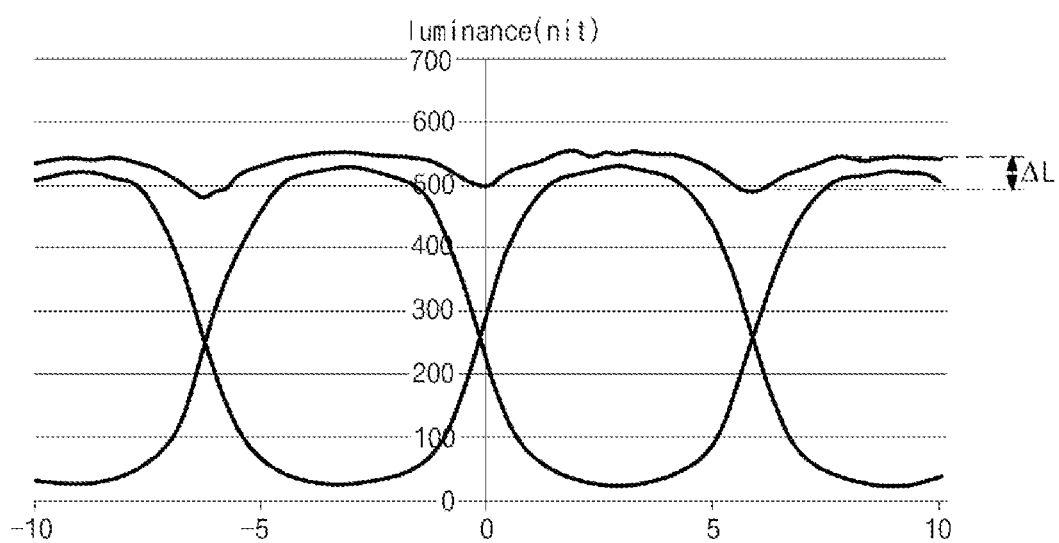
FIG. 6 is a graph of luminance in the barrier panel without a diffraction unit.

FIG. 6 is a graph showing the luminance of the barrier panel.

As shown in FIG. 6, the luminance curve for each of the four barriers is expressed as a quadratic function curve, and the interval of each maximum value is the same as the interval between the barriers. When the user moves, the barrier is switched at the point where the luminance curves of each barrier meet, and the luminance at this barrier switching point is lower than the maximum value. For example, the luminance is lowered from 550 nits to 500 nits at the barrier switching point, so that luminance non-uniformity ($\Delta V$) of about 50 nits is occurred and this luminance non-uniformity causes a fatal defect of the 3D display device.

In order to prevent the luminance non-uniformity, in this disclosure, the barrier electrode includes a diffraction unit. The diffraction unit diffracts the light passing the transmission region to improve the luminance at the barrier switching point in the transmission region.

Figure 7A:
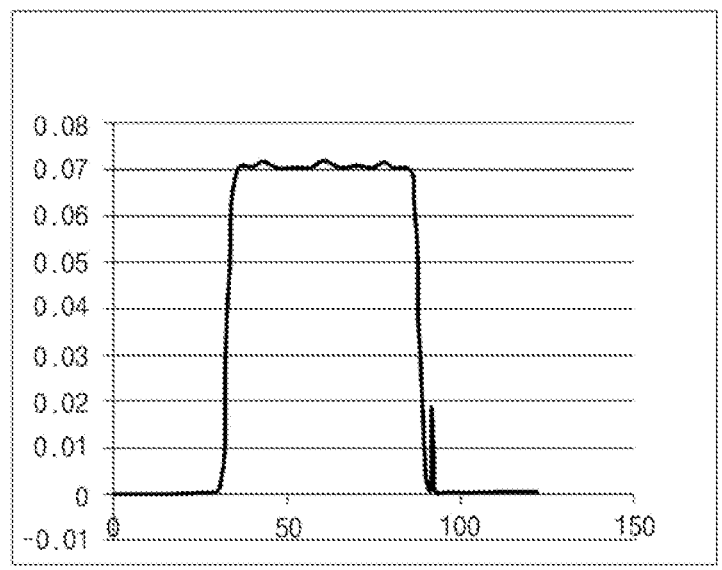
FIG. 7A is the graph of light intensity passing a light transmission region of the barrier panel without the diffraction unit.
Figure 7B:
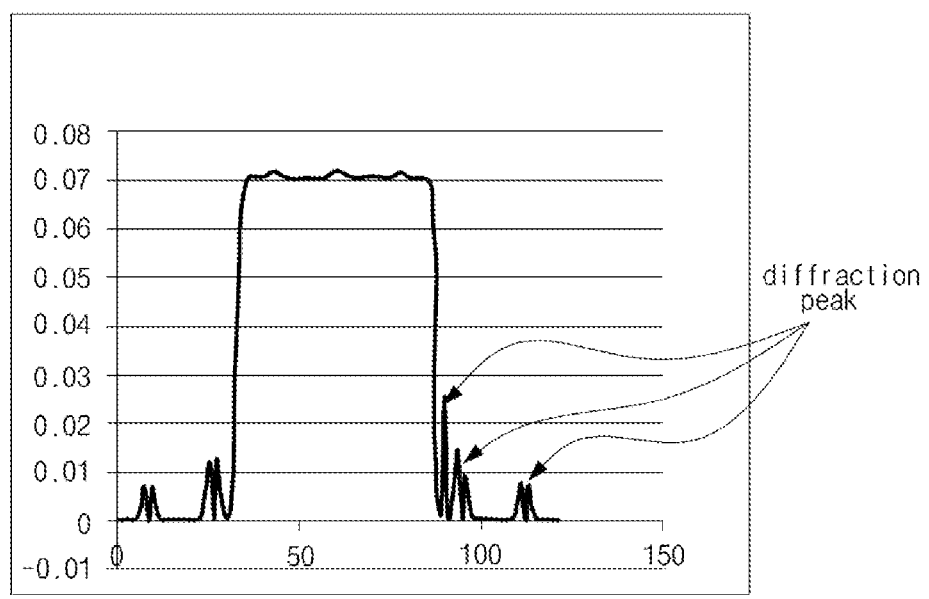
FIG. 7B is the graph of light intensity passing the light transmission region of the barrier panel having the diffraction unit.

FIG. 7A is a view showing the intensity of light passing through the transmission region of the barrier panel without the diffraction unit 197, and FIG. 7B is a view showing the intensity of light passing through the transmission region of the barrier panel 160 with the diffraction unit 197.

As shown in FIG. 7A, in the barrier panel without the diffraction unit 197, the light from the display panel 110 is transmitted between the barrier electrodes 173 so that the intensity of the light becomes 0 at areas other than the transmission region.

On the contrary, in the barrier panel 160 having the diffraction unit 197, the light transmitting between the barrier electrodes 174 has predetermined intensity and the light at areas other than the transmission region is transmitted the diffraction unit 197 to generate diffraction peak.

Figure 8:
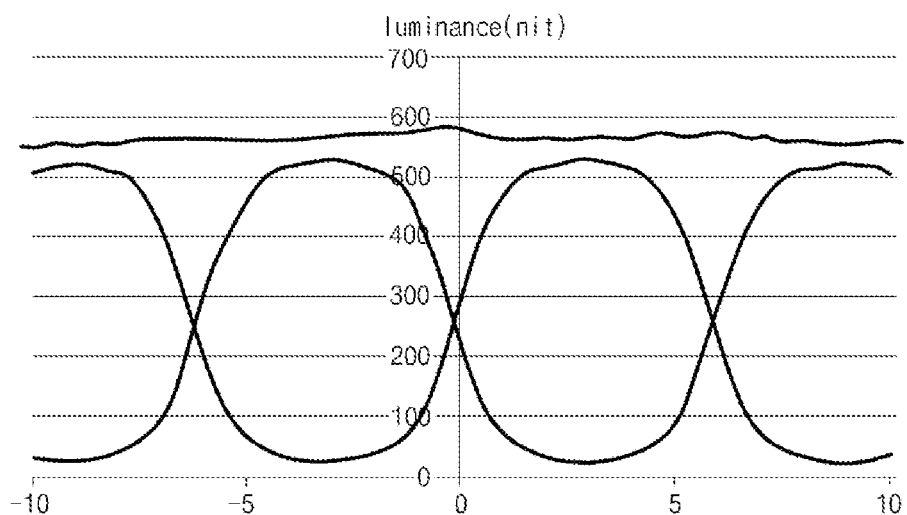
FIG. 8 is the graph of the luminance in the barrier panel having the diffraction unit.

This diffraction peak can improve the luminance at the barrier switching point in the transmission region. FIG. 8 is the graph showing the luminance of the barrier panel 160 having diffraction unit 160 according to this disclosure.

In the case of the barrier panel 160 without the diffraction unit 197, as shown in FIG. 6, the luminance is lowered from 550 nits to 500 nits at the barrier switching point, so that the luminance non-uniformity ($\Delta V$) of about 50 nits is occurred. On the other hand, in the barrier panel 160 having diffraction unit 197 according to this disclosure, the overall luminance is maintained at about 580 nits. Therefore, in the barrier panel 160 according to this disclosure, compared to the barrier panel without the diffraction unit 197, the luminance may be increased by about 30 nits as a whole and the luminance non-uniformity, in which the luminance is decreased, at the barrier switching point is not occurred.

The diffraction unit 197 can be formed in the various shapes. In this aspect, the diffraction unit 197 is gap d between the barrier electrodes 173, that is, space between the barrier electrodes 173. The gap d acts as a diffraction slit so that the light passing through the plurality of the diffraction slits forms a diffraction peak, thereby increasing the luminance of the barrier panel 160 and preventing the luminance non-uniformity.

The gap d between the barrier electrodes 173 can be determined by the distance between the barrier panel 160 and the display panel 110, watching distance of the user, and the pitch of the barrier electrodes 17 etc.

As described above, in the 3D display device 100 according to this disclosure, since the diffractive unit 197 is formed in the barrier electrode 173, the luminance non-uniformity can be prevented when each of the block region and the transmission region moves by the pitch of the barrier electrode 173

Further, in this disclosure, the contrast and the transmittance of the 3D image can be improved by the diffraction unit 197. In the case of the barrier panel 160 without the diffractive unit, the 3D contrast is about 0.68, whereas in the case of the barrier panel 160 having diffraction unit 173 according to this disclosure, the 3D contrast is improved to about 0.84. In addition, in the case of the barrier panel 160 without the diffractive unit, the transmittance is about 20.202 (A.U), whereas in the case of the barrier panel 160 having diffraction unit according to this disclosure, the transmittance is improved to about 21.857 (A.U).

Figure 9A:
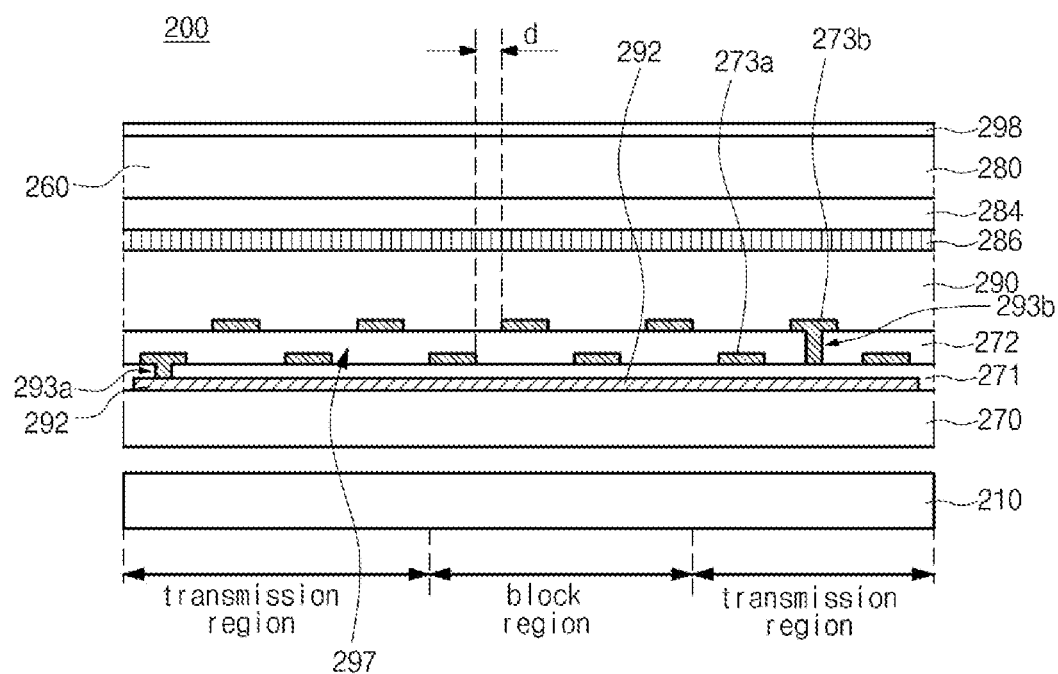
FIGS. 9A and 9B are views illustrating structure of the 3D display device according a second aspect of this disclosure.
Figure 9B:
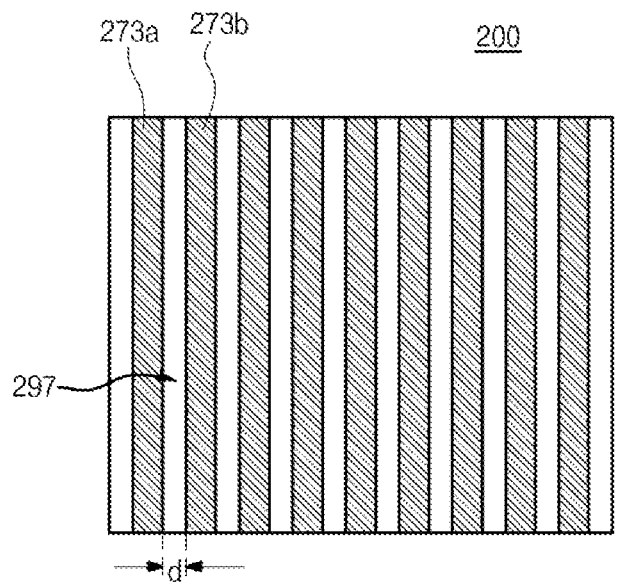

FIG. 9A is a sectional view of the 3D display device 200 according to the second aspect of this disclosure, and FIG. 9B is a plan view showing arrangement of the barrier electrodes. The same structure as that of the 3D display device 100 illustrated in FIG. 3 will be omitted or briefly described for convenience of explanation.

As shown in FIGS. 9A and 9B, the 3D display device according to the second aspect includes the display panel 210 and the barrier panel 260 in the front of the display panel to switch and display the 2D image and 3D image by blocking and transmitting selectively the left-eye image and the right-eye image from the display panel 210.

The display panel 210 includes a plurality of the left-eye pixel for display left-eye image information and a plurality of the right-eye pixel for display right-eye image information.

The barrier panel 260 includes the first substrate 270, the second substrate 280, and the liquid crystal layer 290 therebetween.

The first insulating layer 271 is formed on the first substrate 270 and a plurality of first barrier electrodes 273a are formed on the first insulating layer 271. Further, the second insulating layer 272 is formed on the first insulating layer on which the first barrier electrodes 273a are formed, and a plurality second barrier layer 273b are formed on the second insulating layer 272. The first and second barrier electrodes 273a and 273b are alternatively and repeatedly disposed in the predetermined gap d.

The first and second barrier electrodes 273a and 273b are made of transparent metallic oxide such as ITO or IZO.

The driving electrode 292 is formed in the first substrate 270. The driving electrode 292 is electrically connected to the first barrier electrode 273a and the second barrier electrode 273b through a first contact hole 293a formed in the first insulating layer 271 and a second contact hole 293b formed in the first and second insulating layers 271 and 272 to apply the voltage to the first barrier electrode 273a and the second barrier electrode 273b. The driving electrode 292 is made of metal having good conductivity such as Al or Al alloy and the transparent conductive material such as ITO or IZO.

On the inner surface of the second substrate 280 which is facing with the first substrate 270, the planarization layer 284 is formed in the whole area of the second substrate 280 and the common electrode 286 is formed on the planarization layer 294. The common electrode 286 made of transparent conductive material such as ITO or IZO is formed in the whole area of the second substrate 280.

A spacer (not shown in figure) is disposed between the first substrate 270 and the second substrate 280 to maintain uniformly the gap therebetween. Although not shown in figure, a sealant may be coated at the outer region of the first substrate 270 and the second substrate 280 to attach the first substrate 270 and the second substrate 280 and to seal the liquid crystal layer 290.

The common voltage is applied to the common electrode 286 and a driving voltage is applied to the first barrier electrode 273a and the second barrier electrode 273b to apply an electric field to the liquid crystal layer 290 caused by a voltage difference of the common electrode 286 and the first and second barrier electrodes 273a and 273b, so that liquid crystal molecules are aligned along the electric field.

Not shown in figure, the first alignment layer and the second alignment layer, which are align-treated by rubbing process, are respectively formed on the first substrate 170 and the second substrate 280 and the liquid crystal molecules are aligned along the alignment direction of the first alignment layer and the second alignment layer.

The polarization plate 298 is attached to the outer surface of the second substrate 280. The polarization plate 298 blocks and transmits the light through the liquid crystal layer 290 to implement 2D image and 3D image.

In the barrier panel 260 of this aspect, the first barrier electrode 273a and the second barrier electrode 273b are alternately and repeatedly arranged on different layers. In this case, the first barrier electrode 273a and the second barrier electrode 273b disposed on the different layers are spaced apart from each other by a predetermined distance d.

In this case, the gap d between the first barrier electrode 273a and the second barrier electrode 273b forms the diffraction unit 297. Accordingly, when the light is transmitted through the transmission region, the luminance of the light output from the barrier panel 260 is improved as a whole and the luminance non-uniformity at the barrier switching point can be prevented by the diffraction unit 297.

Figure 10:
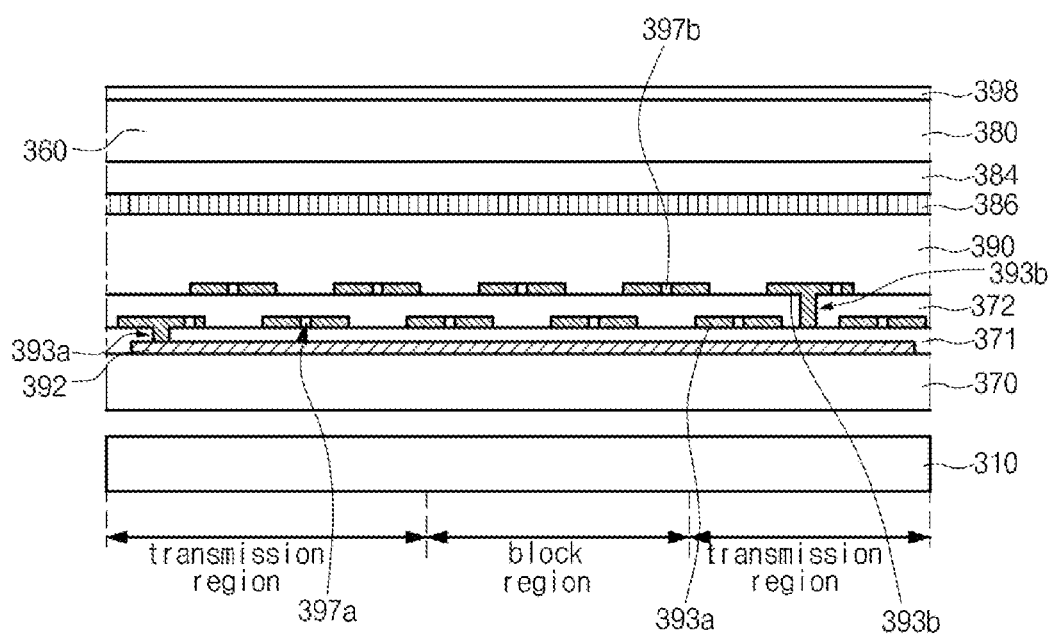
FIG. 10 is the section view of the 3D display device according a third aspect of this disclosure.

FIG. 10 is a view showing the structure of the display device 300 according to the third aspect of this disclosure. In this case, the same structure as that of the display device 200 according to the second aspect of FIG. 9 will be omitted or simplified, and only other structures will be described in detail.

As shown in FIG. 10, the 3D display device according to this aspect includes the display panel 310 and the barrier panel 360 in the front of the display panel to switch and display the 2D image and 3D image by blocking and transmitting selectively the left-eye image and the right-eye image from the display panel 310.

The first barrier electrode 373a and the second barrier electrode 373b of the barrier panel 360 are alternately and repeatedly arranged on different layers, and the adjacent first and barrier electrodes 373a and 373b are partially overlapped for each other. Thus, in the barrier panel 360 of this aspect, the light transmitting the barrier panel 360 is not diffracted.

In this aspect, diffraction opening units 397a and 397b are respectively formed in the first barrier electrode 373a and the second barrier electrode 373b so that the light transmitting the transmission region interferes constructively by the opening units 397a and 397b, so that the luminance of the light from the barrier panel 360 can be improved and the luminance non-uniformity at the barrier switching point can be prevented.

Figure 11A:
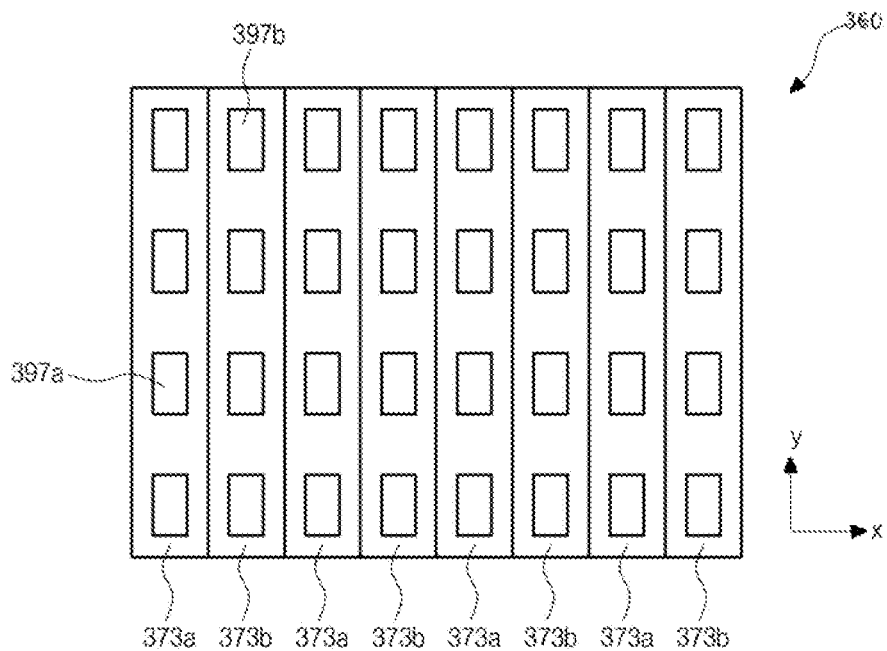
FIGS. 11A and 11B are views respectively illustrating the structures of the barrier electrode and an opening in the barrier panel according to the third aspect of this disclosure.
Figure 11B:
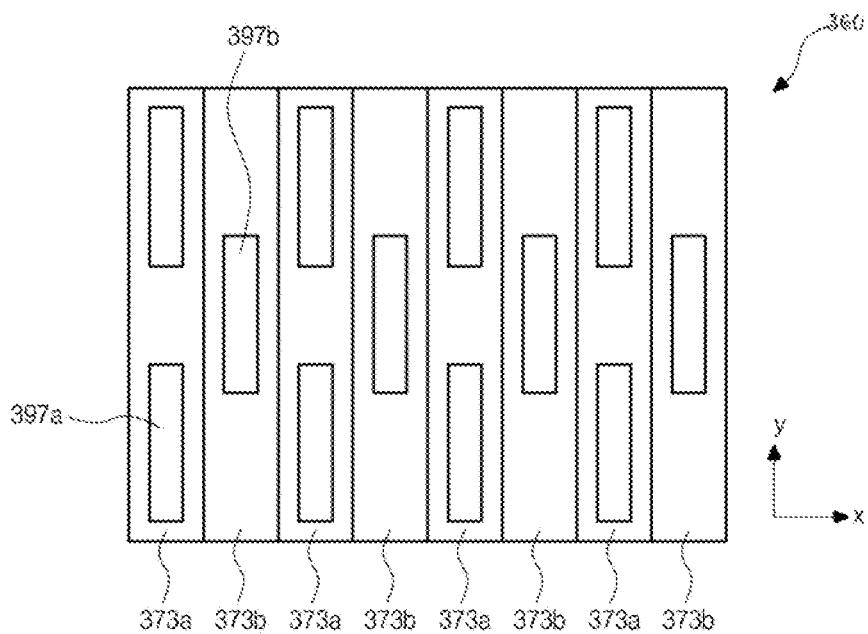

FIGS. 11A and 11B are plan views of the barrier panel 360 of the third aspect of this disclosure and the diffraction opening units 397a and 397b are respectively formed in the first barrier electrode 373a and the second barrier electrode 373b in the figure.

As shown in FIG. 11A, the first barrier electrode 373a and the second barrier electrode 373b extend along the x-direction in a band shape of a set width and are alternately arranged in plurality along the y-direction. At this time, although not precisely illustrated in the drawings, the adjacent first and second barrier electrodes 373a and 373b overlap each other.

The first opening unit 397a and the second opening unit 397b are formed in the first barrier electrode 373a and the second barrier electrode 373b, respectively. A plurality of first and second openings 397a and 397b are formed along the longitudinal direction of first and second barrier electrodes 373a and 373b.

The first opening unit 397a and the second opening unit 397b may be formed at the same position of the first barrier electrode 373a and the second barrier electrode 373b, respectively.

As shown in FIG. 11B, the first opening unit 397a and the second opening unit 397b may be alternately formed in the first barrier electrode 373a and the second barrier electrode 373b, respectively. The width of the first opening unit 397a and the second opening unit 397b may be determined by the gap between the barrier panel 360 and the display panel 310, the watching distance of the user, the pitch of the barrier electrodes 373a and 373b, etc.

As described above, in this disclosure, the diffraction unit is formed to improve the overall luminance of the light passing through the barrier panel. Further, it is possible to prevent luminance non-uniformity that occurs when the blocking region and the transmission region move by the pitch of the barrier electrode, respectively.

Meanwhile, in this disclosure described above, the barrier panel and the display panel having respectively a specific structure, but this disclosure is not limited to the barrier panel and display device having a specific structure. That is, in this disclosure, as long as the diffractive member can be formed on the barrier electrode, this disclosure can be applied to barrier panels and display devices of all known structures.

It should be understood that the aspects of the present disclosure are not limited to the above described aspects and the accompanying drawings, and various substitutions, modifications, and alterations can be devised by those skilled in the art without departing from the technical spirit of the present disclosure. Therefore, the scope of the present disclosure is defined by the appended claims, and all alternations or modifications derived from the meaning and scope of the claims and their equivalents should be construed as being included within the scope of the present disclosure.

What is claimed is:

1. A barrier panel, comprising:
   a first substrate and a second substrate, each having a block region and a transmission region;
   a liquid crystal layer disposed between the first and second substrates and including a plurality of liquid crystal molecules aligned in a predetermined direction;
   a plurality of barrier electrodes disposed in the block region and the transmission region of the first substrate;
   a common electrode disposed on the second substrate to apply an electric field to the liquid crystal layer with the plurality of barrier electrodes;
   a diffraction unit including at least one opening in each barrier electrode to diffract light transmitting therethrough; and
   a polarization plate disposed over the second substrate,
   wherein an optical axis direction of the polarization plate is parallel to the predetermined direction of the liquid crystal molecules to transmit an image through an area where the electric field is not applied, and
   wherein the plurality of barrier electrodes pass light to constructively interfere with light passing through the opening.

2. The barrier panel of claim 1, further comprising a driving electrode to apply a driving voltage to the plurality of barrier electrodes.

3. The barrier panel of claim 1, wherein the diffraction unit further includes a gap between adjacent barrier electrodes among the plurality of barrier electrodes.

4. The barrier panel of claim 1, wherein the adjacent barrier electrodes are disposed on a same layer.

5. The barrier panel of claim 1, wherein the adjacent barrier electrodes are disposed on different layers.

6. The barrier panel of claim 1, wherein the adjacent barrier electrodes are disposed on different layers and a part of the adjacent barrier electrodes overlaps with each other.

7. The barrier panel of claim 1, wherein the opening is disposed at a same position of the adjacent barrier electrodes.

8. The barrier panel of claim 1, wherein the opening is alternately disposed in the adjacent barrier electrodes.

9. The barrier panel of claim 1, further comprising a first alignment layer and a second alignment layer respectively disposed on the first substrate and the second substrate.

10. A display device, comprising:
    a display panel for displaying an image; and
    a barrier panel comprising:
    a first substrate and a second substrate having a block region and a transmission region;
    a liquid crystal layer disposed between the first substrate and the second substrate and including a plurality of liquid crystal molecules aligned in a predetermined direction;
    a plurality of barrier electrodes disposed in the block region and the transmission region of the first substrate;
    a common electrode disposed on the second substrate to apply an electric field to the liquid crystal layer with the barrier electrode;
    a diffraction unit including at least one opening in each barrier electrode to diffract light transmitting therethrough; and
    a polarization plate disposed over the second substrate,
    wherein an optical axis direction of the polarization plate is parallel to an alignment direction of the liquid crystal molecules to transmit the image through an area where the electric field is not applied, and
    wherein the barrier panel is disposed at a front side of the display panel to display 2 dimensional images and 3 dimensional images, and
    wherein the plurality of barrier electrodes pass light to constructively interfere with light passing through the opening.

11. The display device of claim 10, wherein the display panel includes a liquid crystal display panel, an organic light emitting display panel, an electrophoresis display panel, a micro LED display panel, and a mini LED display panel.

12. The display device of claim 10, wherein the opening in each barrier electrode of the plurality of barrier electrodes comprises a plurality of openings in a longitudinal direction.

13. The display device of claim 10, wherein a width of each opening is based on a watching distance of a user.

14. The display device of claim 10, wherein a pitch of each opening is based on a watching distance of a user.

15. The barrier panel of claim 1, wherein the opening in each barrier electrode of the plurality of barrier electrodes comprises a plurality of openings in a longitudinal direction.

16. The barrier panel of claim 15, wherein a width of each opening is based on a watching distance of a user.

17. The barrier panel of claim 15, wherein a pitch of each opening is based on a watching distance of a user.

18. The barrier panel of claim 15, wherein a width of each opening and a pitch of each opening is based on a watching distance of a user.

19. The barrier panel of claim 1, wherein the plurality of barrier electrodes includes a pair of barrier electrodes that are adjacent and have openings separated by a common pitch in a longitudinal direction, wherein openings of a first barrier electrode of the pair are offset with respect to openings of a second barrier electrode of the pair.

\* \* \* \* \*